(12) United States Patent
Panse et al.

(10) Patent No.: US 11,182,191 B2
(45) Date of Patent: Nov. 23, 2021

(54) NESTED HOST MANAGER IN A HYPER-CONVERGED INFRASTRUCTURE

(71) Applicant: VMWARE, INC., Palo Alto, CA (US)

(72) Inventors: Tejas Sanjeev Panse, Palo Alto, CA (US); Suket Gakhar, Palo Alto, CA (US); Anant Kumar, Palo Alto, CA (US); Lakshmi Narasimhan, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 134 days.

(21) Appl. No.: 16/288,139

(22) Filed: Feb. 28, 2019

(65) Prior Publication Data
US 2020/0201665 A1 Jun. 25, 2020

(30) Foreign Application Priority Data
Dec. 19, 2018 (IN) .............................. 201841048141

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/4557* (2013.01); *G06F 2009/45566* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 10,261,775 B1* | 4/2019 | Ramsay | G06F 9/45558 |
| 2013/0268643 A1* | 10/2013 | Chang | G06F 9/4856 709/223 |
| 2015/0149999 A1 | 5/2015 | Ramanathan et al. | |
| 2015/0372867 A1* | 12/2015 | Amann | H04L 67/1097 709/221 |
| 2016/0306648 A1 | 10/2016 | Deguillard et al. | |
| 2016/0313985 A1 | 10/2016 | Sprygada et al. | |
| 2017/0031710 A1 | 2/2017 | Kuik et al. | |
| 2018/0331973 A1 | 11/2018 | Mani et al. | |
| 2019/0034240 A1 | 1/2019 | Nabi et al. | |
| 2019/0286475 A1* | 9/2019 | Mani | G06F 9/4856 |
| 2020/0125382 A1 | 4/2020 | Castet | |

* cited by examiner

*Primary Examiner* — Lewis A Bullock, Jr.
*Assistant Examiner* — Melissa A Headly

(57) ABSTRACT

In a computer-implemented method for using a nested host manager in a hyper converged infrastructure to streamline the upgrade process for one or more hosts in a workload domain, a first workload domain having one or more hosts is chosen, and at least one host of the one or more hosts is designated for an upgrade. The resource allotment of the at least one host is evaluated and a nested host having a comparable resource allotment is selected and provided in a second workload domain. Communication is redirected from the at least one host to the nested host. The at least one host is placed in a maintenance mode, updated, and returned to an operational mode.

14 Claims, 10 Drawing Sheets

NESTED HOST MANAGER IN A HYPER-CONVERGED INFRASTRUCTURE

RELATED APPLICATIONS

Benefit is claimed under 35 U.S.C. 119(a)-(d) to Foreign Application Serial No. 201841048141 filed in India entitled "NESTED HOST MANAGER IN A HYPERCONVERGED INFRASTRUCTURE", on Dec. 19, 2018, by VMware, Inc., which is herein incorporated in its entirety by reference for all purposes.

BACKGROUND

In conventional virtual computing environments, creating and managing hosts (e.g., ESX hosts) and virtual machines may be complex and cumbersome. Oftentimes, a user, such as an IT administrator, requires a high level and complex skill set to effectively manage workloads and workload domains, including allocation of hosts, as well as upgrading, troubleshooting, and/or replacing hosts of particular workload domains. This process is often made even more difficult due to the distributed nature of conventional virtual computing environments.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DETAILED DESCRIPTION OF CERTAIN EMBODIMENTS

Figure 1:
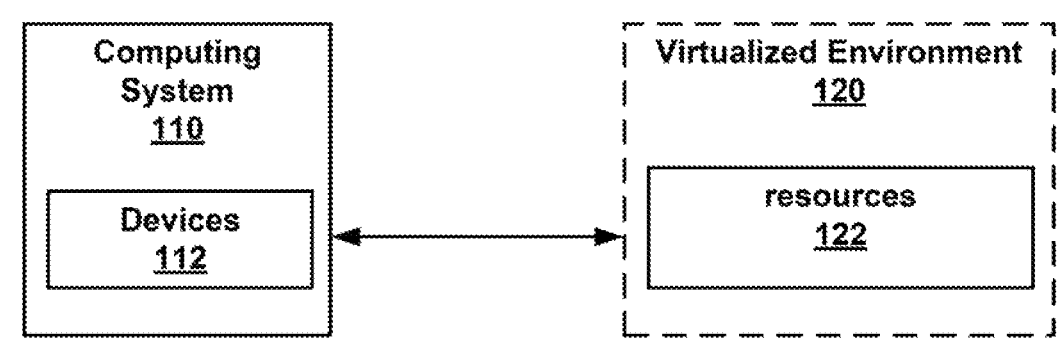
FIG. 1 depicts a block diagram of a virtual computing environment, according to various embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "managing," "maintaining," "receiving," "allocating," "updating," "resetting," "applying," "patching," "upgrading," "releasing," "provisioning," or the like, refer to the actions and processes of an electronic computing device or system such as: a host processor, a processor, a memory, a hyper-converged appliance, a software defined network (SDN) manager, a system manager, a virtualization management server or a virtual machine (VM), among others, of a virtualization infrastructure or a computer system of a distributed computing system, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory computer-readable storage medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, perform one or more of the methods described herein. The non-transitory computer-readable data storage medium may form part of a computer program product, which may include packaging materials.

The non-transitory computer-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some respects, the functionality described herein may be provided within dedicated software modules or hardware modules configured as described herein. Also, the techniques could be fully implemented in one or more circuits or logic elements. A general-purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Example embodiments described herein utilize a nested host manager in a hyper-converged infrastructure to streamline the upgrade process for hosts in workload domains. In a hyper-converged infrastructure (HCI) context, a workload domain is a policy-based resource container with specific availability and performance attributes that combines compute (vSphere), storage (vSAN) and networking (NSX) into a single consumable entity. Workload domains can be though off as a cluster of hypervisors (ESXi) with an entity (vCenter) responsible for managing it. Policies configured on a workload domain ensures high availability of the VMs when hosts are temporarily unavailable during upgrades.

In addition, upgrades are tedious and error prone processes when performed manually. Partially automated solutions (LCM in VMware Cloud Foundation) try to alleviate this issue by using features like 'upgrade scheduling' which allows administrators to schedule upgrades at a time of their choice. As an example, IT administrators might choose to upgrade at a time when overall 10 operations are low.

Some current solutions prefer an in-place upgrade, where a host in the cluster is put in maintenance mode before an upgrade which in turn moves workload VMs to other hosts in the cluster. But there are some issues with this approach including the problem that the rest of the hosts in the cluster are responsible for handling additional workload VMs of the host to be upgraded affecting the cluster performance and support for deployment of new Virtual machines in the workload domain being upgraded is limited due to the resource crunch.

In the case where there is an unusable hosts because of upgrade failures, intervention from Tech teams is require. This intervention is a costly operation owing the time taken for the back-and-forth/debugging by Tech support. Moreover, for domain operations to continue normally, additional physical hosts must be added.

Deleteriously, customer defined policies on a workload domain might have to be modified to allow an upgrade to proceed. For example, there is a workload domain (WLD) with 3 hosts, and an anti-affinity rule specifying that 2 VMs tagged as Database VM cannot exist on the same host. Further, assume there are 3 such VMs residing in the WLD, each running on a different host because of the anti-affinity rule. In such cases, a host cannot enter maintenance mode since the database VM would have to move to a different host in the WLD violating the anti-affinity rule (since one of the host will have to end up with 2 DB VMs). This example illustrates a blocker for the WLD upgrade and involves manual intervention to change the policy.

For these reason, upgrading multiple hosts in a cluster in parallel is not preferred. IT administrators are also known to dread upgrades since it involves a lot of pre-planning to carve additional physical resources with appropriate configurations to handle unexpected failure scenarios and the temporary performance degradation Embodiments described herein provide methods for allocating a host of a pre-configured hyper-converged computing device to a workload domain. In one embodiment, nested host(s) (e.g., a hypervisor in a Virtual Machine) can be deployed, configured, and added to the workload domain as substitute host(s) to maintain the cluster strength of a different workload domain during an upgrade. Meaning, when the physical host is taken down for an upgrade, it will be substituted by one or more nested hosts such that the cluster strength in terms of CPU, Memory and Storage is preserved.

In one embodiment, HCI Manager, an entity managing the Hyper-converged Infrastructure is well positioned to control all aspects of the hardware and software resources bundled within the HCI instance. HCI Manager, much like the SDDC_Manager service in VMware Cloud Foundation solution, is responsible for creation and maintenance of workload domains including Life Cycle management of all the components in the software defined datacenter.

With complete knowledge of the HCI instance, HCI Manager is able to provide information about workload domains that are not running at their full capacity. In one embodiment, these underutilized workload domains are chosen to run nested hosts to aid an upgrade of another workload domain. In a case where the use of an underutilized workload domain is not feasible (e.g., owing to organizational restrictions, or the like) a secure workload domain is configured with a set of physical hosts meant to run only nested hosts.

In one embodiment, the nested host(s) are deployed on the management workload domain where the HCI manager, along with other components to manage the HCI instance are deployed.

Embodiments of a Virtual Computing Environment

FIG. 1 depicts a block diagram that illustrates virtual computing environment (VCE) 100 (or virtualization infrastructure) that includes computing system 110 and virtualized environment 120, according to various embodiments. In general, computing system 110 and virtualized environment 120 are communicatively coupled over a network such that computing system 110 may access functionality of virtualized environment 120.

As will be described in further detail below, computing system 110 is implemented using virtualized environment 120. Also, while implementing the business functionality, computing system 110 might use some of resources 122.

In one embodiment, computing system 110 may be a system (e.g., enterprise system) or network that includes a combination of computer hardware and software. The corporation or enterprise utilizes the combination of hardware and software to organize and run its operations. To do this, system 110 uses resources 122 because system 110 typically does not have dedicated resources that can be given to the virtualized environment. For example, an enterprise system may provide various computing resource for various needs such as, but not limited to information technology (IT), security, email, etc.

In various embodiments, computing system 110 includes a plurality of devices 112. The devices are any number of physical and/or virtual machines. For example, in one embodiment, computing system 110 is a corporate computing environment that includes tens of thousands of physical and/or virtual machines. It is understood that a virtual machine is implemented in virtualized environment 120 that includes one or some combination of physical computing machines. Virtualized environment 120 provides resources 122, such as storage, memory, servers, CPUs, network switches, etc., that are the underlying hardware infrastructure for VCE 100.

The physical and/or virtual machines may include a variety of operating systems and applications (e.g., operating system, word processing, etc.). The physical and/or virtual machines may have the same installed applications or may have different installed applications or software. The installed software may be one or more software applications from one or more vendors. Each virtual machine may include a guest operating system and a guest file system.

Moreover, the virtual machines may be logically grouped. That is, a subset of virtual machines may be grouped together in a container (e.g., VMware vApp™). For example, three different virtual machines may be implemented for a particular workload. As such, the three different virtual machines are logically grouped together to facilitate in supporting the workload. The virtual machines in the logical group may execute instructions alone and/or in combination (e.g., distributed) with one another. Also, the container of virtual machines and/or individual virtual machines may be controlled by a virtual management system. The virtualization infrastructure may also include a plurality of virtual datacenters. In general, a virtual datacenter is an abstract pool of resources (e.g., memory, CPU, storage). It is understood that a virtual data center is implemented on one or some combination of physical machines.

In various embodiments, computing system 110 may be a cloud environment, built upon a virtualized environment 120. Computing system 110 may be located in an Internet connected datacenter or a private cloud computing center coupled with one or more public and/or private networks. Computing system 110, in one embodiment, typically couples with a virtual or physical entity in a computing environment through a network connection which may be a public network connection, private network connection, or some combination thereof. For example, a user may couple via an Internet connection with computing system 110 by accessing a web page or application presented by computing system 110 at a virtual or physical entity.

As will be described in further detail herein, the virtual machines are hosted by a host computing system. A host includes virtualization software that is installed on top of the hardware platform and supports a virtual machine execution space within which one or more virtual machines may be concurrently instantiated and executed.

In some embodiments, the virtualization software may be a hypervisor (e.g., a VMware ESX™ hypervisor, a VMware ESXi™ hypervisor, etc.) For example, if hypervisor is a VMware ESX™ hypervisor, then virtual functionality of the host is considered a VMware ESX™ server. It should be appreciated that multiple versions of the hypervisor may be concurrently available for use, some of which may be supported by a developer and some of which are no longer supported. For instance, a developer may define a compatibility window of supported hypervisor versions. For example, the developer may define the compatibility window as N−2, where N is the current version, such that the current version and the two prior versions are supported. Updated versions of the hypervisor may be made available for a number of reasons, such as enhancements, performance improvements, or to correct security vulnerabilities. Whether a hypervisor version is supported may also depend on the reasons for updating to a new version. For example, if a hypervisor version compromises the security integrity of the host or VMs, this hypervisor version may no longer be supported.

Additionally, a hypervisor or virtual machine monitor (VMM) is a piece of computer software, firmware or hardware that creates and runs virtual machines. A computer on which a hypervisor is running one or more virtual machines is defined as a host machine. Each virtual machine is called a guest machine. The hypervisor presents the guest operating systems with a virtual operating platform and manages the execution of the guest operating systems. Additional details regarding embodiments of structure and functionality of a host computer system are provided with respect to FIG. 2.

During use, the virtual machines perform various workloads. For example, the virtual machines perform the workloads based on executing various applications. The virtual machines can perform various workloads separately and/or in combination with one another.

Example Host Computer System

Figure 2:
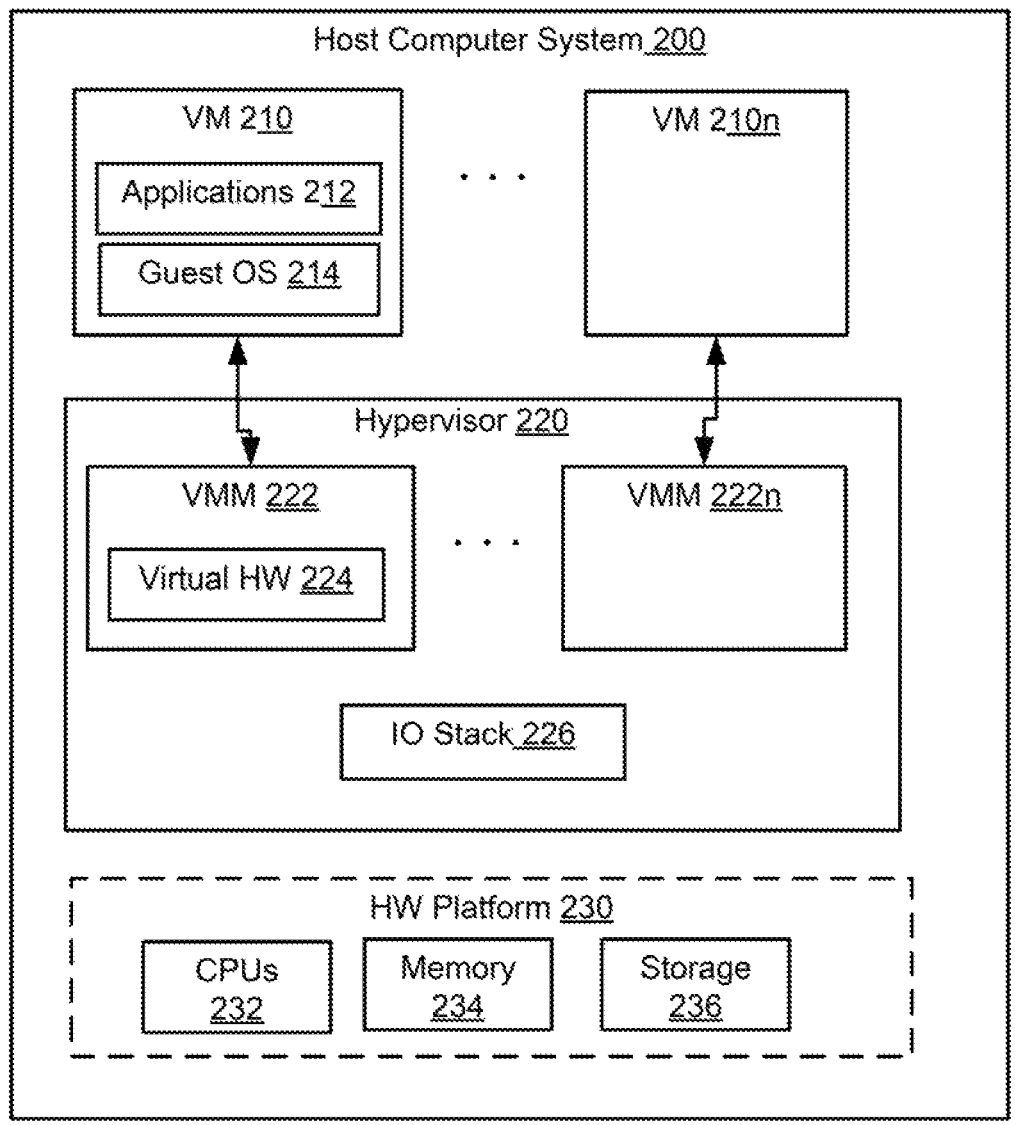
FIG. 2 depicts a block diagram of a host computing system, according to various embodiments.

FIG. 2 is a schematic diagram that illustrates a virtualized computer system that is configured to carry out one or more embodiments of the present invention. The virtualized computer system is implemented in a host computer system 200 including hardware platform 230. In one embodiment, host computer system 200 is constructed on a conventional, typically server-class, hardware platform.

Virtualized computer systems are implemented in host computer system 200 that includes hardware platform 230 (e.g., physical computing resources). Hardware platform 230 includes one or more central processing units (CPUs) 232, system memory 234, and storage 236. Hardware platform 230 may also include one or more network interface controllers (NICs) that connect host computer system 200 to a network, and one or more host bus adapters (HBAs) that connect host computer system 200 to a persistent storage unit.

Hypervisor 220 is installed on top of hardware platform 230 and supports a virtual machine execution space within which one or more virtual machines (VMs) may be concurrently instantiated and executed. Each virtual machine implements a virtual hardware platform that supports the installation of a guest operating system (OS) which is capable of executing applications. For example, virtual hardware 224 for virtual machine 210 supports the installation of guest OS 214 which is capable of executing applications 212 within virtual machine 210. An example hypervisor is, but is not limited to a VMware ESXi™ hypervisor.

Guest OS 214 may be any of the well-known commodity operating systems, and includes a native file system layer, for example, either an NTFS or an ext3FS type file system layer. Example operating systems include, without limitation, Windows operating systems (e.g., Windows 7, Windows 8, Windows 10, or Windows Server 2012 R2), UNIX operating systems (e.g., Mac OS X server), and Linux operating systems.

IOs issued by guest OS 214 through the native file system layer appear to guest OS 214 as being routed to one or more virtual disks provisioned for virtual machine 210 for final execution, but such IOs are, in reality, reprocessed by IO stack 226 of hypervisor 220 and the reprocessed IOs are issued, for example, through an HBA to a storage system.

Virtual machine monitor (VMM) 222 and 222n may be considered separate virtualization components between the virtual machines and hypervisor 220 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

Examples of an Appliance

Figure 3:
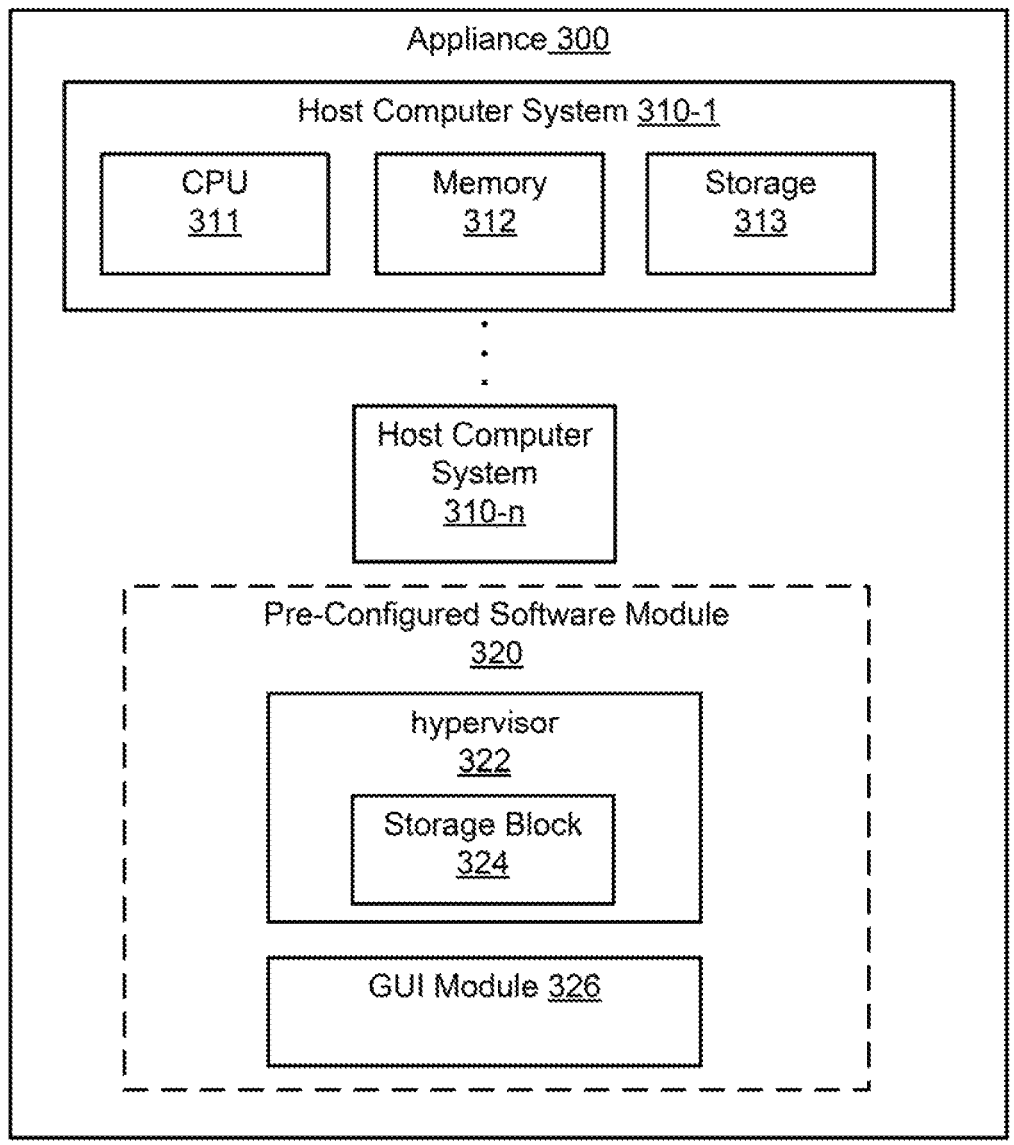
FIG. 3 depicts a block diagram of an appliance, according to various embodiments.

FIG. 3 depicts an embodiment of appliance 300. Appliance 300 is a computing device that includes the requisite physical hardware and software to create and manage a virtualization infrastructure. Appliance 300 is also referred to herein as a pre-configured hyper-converged computing device. In general, a hyper-converged computing device includes pretested, pre-configured and pre-integrated storage, server and network components, including software, that are located in an enclosure. Moreover, the hyper-converged computing device includes a hypervisor that supports a virtualization infrastructure.

Based on the pre-configured hardware and software disposed within appliance 300, appliance 300 enables a user to simply and quickly create a virtualization infrastructure and deploy virtual machines shortly after the appliance is powered on for the first time.

Appliance 300 includes, among other things, at least one host computer system. For example, host computer system 310-1 through host computer system 310-n. Host computer system 310-1 includes a central processing unit (CPU) 311, memory 312, and storage 313. It should be appreciated that other host computer systems (e.g., host computer system 310-n) each include a CPU, memory, and storage similar to host computer system 310-n.

Appliance 300 is scalable. That is appliance can be scaled to include more than one host computer system. For example, appliance 300 can initially have a single host computer system. However, additional host computer system may be included in appliance 300.

In one embodiment, appliance 300 is able to deploy a plurality of virtual machines in the virtualization infrastructure. For example, based on the hardware and software incorporated in appliance 300, appliance 300 is able to deploy pre-set number of virtual machines (e.g., 75 virtual machines, 150 virtual machines, etc.).

Moreover, each host computer system may be considered a server or host computing system. That is, each host computer system is able to independently host a number of virtual machines. For example, host computer system 310-1 is able to host a first set of virtual machines, while other host computer systems are each able to independently host other sets of virtual machines, respectively.

The host computer systems are independent of one another, and are not required to share any functionality with one another. Appliance 300 does not include a backplane. As such, the host computer systems are isolated from one another and therefore independent of one another.

CPU 311 may be, but is not limited to, a dual socket CPU (e.g., Intel Xeon™ CPUs, 4-core to 6-core). Memory 312 may be, but is not limited to, 128 gigabytes (GB). Storage may be, but is not limited to, three drive slots per node. Such as a solid state drive (SSD) (e.g., an SSD up to 800 GB), and two hard disk drives (HDD) (e.g., HDDs up to 8 terabytes (TB)).

Additionally, the appliance may include various external interfaces, such as but not limited to, serial, network RJ-45 (10000 NIC), graphics, management RJ-45 (100/10000 NIC), power (in front and in rear), UID (in front and in rear) and a USB.

The appliance may also include Component Interconnect Express (PCIe) expansion slots, and a disk controller with pass through capabilities. It should be appreciated that the appliance may include other hardware attributes that are compatible with supporting a virtualization infrastructure.

In one embodiment, appliance 300 is a rackable 2U/4Node appliance. That is, appliance 300 is two rack units in height and includes four host computer system (e.g., host computer systems 310-1 through 310-n).

The size of a piece of rack-mounted equipment is described as a number in "U" or "RU" (rack unit). One rack unit is often referred to as "1U", 2 rack units as "2U" and so on. "U" is a unit of measure that describes the height of equipment designed to mount in a rack (e.g., 19-inch rack or a 23-inch rack). The 19-inch (482.6 mm) or 23-inch (584.2 mm) dimension refers to the width of the equipment mounting frame in the rack including the frame. In some instances, one rack unit is 1.75 inches (4.445 cm) high.

In another embodiment, appliance 300 is a 4U/4Node appliance. That is, appliance 300 is four rack units in height and includes four host computer system (e.g., host computer system 310-1 through 310-n).

Appliance 300 includes software to support a virtualization infrastructure. That is, appliance 300 includes code or instructions stored on physical hardware in appliance 300, that when executed by a processor, supports a virtualization infrastructure. For instance, appliance 300 includes pre-configured software module 320.

It should be appreciated that the software installed on appliance 300 (e.g., software module 320) is stored in a storage device. In various embodiments, the software may be installed in a single host computer system or may be distributed in various host computer systems. In another embodiment, the software may be stored in a storage device within appliance 300 but is outside of the host computer systems.

During operation of the appliance, the software may be executed by one or more CPUs in a single host computer system or the execution may be distributed amongst various CPUs in various host computer systems.

Software module 320 includes, among other things, hypervisor 322. As described above, a hypervisor is installed on top of hardware platform (e.g., CPU, memory and storage) and supports a virtual machine execution space within which one or more virtual machines (VMs) may be concurrently instantiated and executed.

In various embodiments, hypervisor 322 is VMware ESX™ hypervisor or a VMware ESXi™ hypervisor. It is noted that "ESX" is derived from the term "Elastic Sky X" coined by VMware™.

It should be appreciated that software module 320, in one embodiment, includes a suite of software tools for cloud computing (e.g., VMware vSphere™, VCenter™) that utilizes various components such as a VMware ESX/ESXi hypervisor. Example hypervisors include, without limitation, VMware ESXi™ hypervisors (e.g., ESXi 6.0, ESXi 6.0.U2, ESXi 6.5, ESXi 6.5.U2, etc.)

Software module 320 includes storage block 324. Storage block 324 is a logical partition of storage (e.g., storage 313) in appliance 300. In other words, storage block 324 is virtual storage. In one embodiment, storage block 324 is a virtual storage area network (VSAN). As a result, the VSAN allows traffic to be isolated within specific portions of a storage area network. Storage block 324 is imbedded or integral with hypervisor 322. In other words, the data path for storage is in the hypervisor layer.

Various advantages occur due to the storage block integrated with the hypervisor. In one example, the VSAN communicates with the ESX layer at a kernel level and is not required to communicate over a network via an Ethernet connection. As such, communication latency between the storage block and hypervisor is reduced.

GUI module 326 is code or instructions that enable the utilization of a graphical user interface to create and manage appliances (e.g., ESX hosts) and virtual machines of the virtualization infrastructure. The graphical user interface is described in further detail below.

It is noted that software module 320 is proprietary software of a single entity (e.g., VMware™). For example, hypervisor 322, storage block 324, and GUI module 326 are proprietary software code to a single entity. That is, hypervisor 322, storage block 324, and GUI module 326 are not open source code, and therefore require a license agreement between the licensor (e.g., VMware™) and a purchaser of the appliance that includes the proprietary software module. In one embodiment, the license agreement is an end-user license agreement (EULA). The EULA establishes the purchaser's right to use the software (e.g., software module 320) and the hardware of appliance 300.

Figure 4:
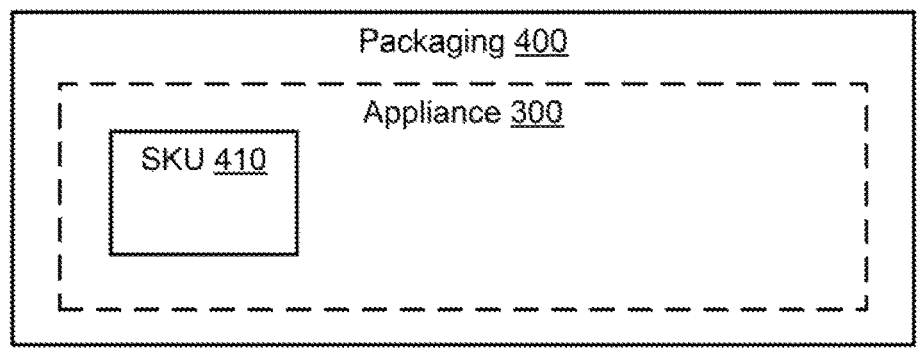
FIG. 4 depicts a block diagram of a side-view of an appliance offered for sale, according to various embodiments.

FIG. 4 depicts an embodiment of a side-view of an appliance offered for sale. In one embodiment, appliance 300 is offered for sale as a single stock keeping unit (SKU). For example, appliance 300 is disposed in packaging 400 and SKU 410 is on packaging 400. Accordingly, appliance 300 is offered for sale as a single SKU.

More specifically, appliance 300, as described herein, is pre-configured with the requisite hardware and software for employing a virtualization infrastructure. Therefore, subsequent the purchase of appliance 300 as a single SKU, appliance 300 is not required to include any additional hardware and/or software to support and manage a virtualization infrastructure.

Upon powering on appliance 300 for the first time, a single EULA is displayed to an end-user. Because software module 320 is proprietary to a single entity (e.g., VMware™), only a single EULA, provided by the single entity, is displayed to the purchasing end-user. More specifically, at least hypervisor 322 (e.g., ESX/ESXi hypervisor) and storage block 324 (e.g., VSAN) are proprietary to a single entity (e.g., VMware™). Therefore, only a single EULA pertaining to hypervisor 322 and storage block 324 is displayed and provided to an end-user.

Upon acceptance of the EULA, appliance 300 is enabled to operate and manage a virtualization infrastructure, and deploy virtual machines in the virtualization infrastructure.

It should be appreciated that upon first powering on appliance 300 and accepting the single EULA, a virtualization infrastructure is able to be rapidly created and a virtual machine is able to be deployed within the virtualization infrastructure within minutes (e.g., 15 minutes). Moreover, the virtualization infrastructure is able to be managed and controlled by an end-user that is not required to have high-level IT administrative training and experience.

In one embodiment, appliance 300 is able to deploy a plurality of virtual machines in the virtualization infrastructure. For example, based on the hardware and software incorporated in appliance 300, appliance 300 is able to deploy pre-set number of virtual machines (e.g., 75 virtual machines, 150 virtual machines, etc.).

Examples of Virtualization Infrastructures

Figure 5:
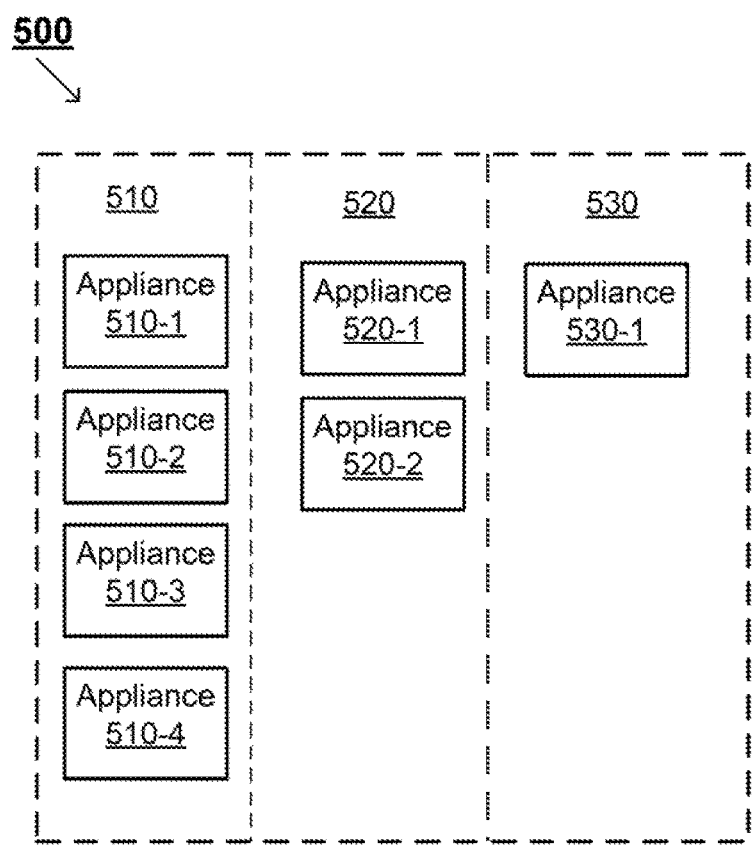
FIG. 5 depicts a block diagram of a virtualization infrastructure, according to various embodiments.

FIG. 5 depicts an embodiment of various appliances supporting virtualization infrastructure 500.

In one embodiment, appliances may be grouped together to increase the functionality of creating and managing a virtualization infrastructure. For example, appliance 510-1 was initially utilized to deploy a plurality of virtual machines, at location 510. However, additional virtual machines were desired but appliance 510-1, alone, was not able to meet the demand for the desired additional virtual machines. As such, additional appliances 510-2, 510-3, and 510-4 were purchased and grouped together to meet the demand of the additional virtual machines. In particular, the cluster of appliances which are communicatively coupled together, act as a single platform for managing the virtualization infrastructure and deploying virtual machines.

Similarly, appliance 520-1 was initially utilized to deploy a plurality of virtual machines, at location 520. However, additional virtual machines were desired but appliance 520-1, alone, was not able to meet the demand for the desired additional virtual machines. As such, additional appliance 520-2 was purchased and grouped together with appliance 520-1 to meet the demand of the additional virtual machines.

It should be appreciated that any number of appliances may be grouped together. For example, two, three, four, five or more appliances may be grouped together provided that the functionality of the appliances, as a whole, are able to act as a single platform for managing the virtualization infrastructure.

Additionally, the appliances and/or clusters of appliances may be located at various locations. For example, a first cluster of appliances may be located at a main office of an enterprise, while a second cluster of appliances are located at a remote office/branch office (ROBO).

In another example, virtualization infrastructure 500 is a virtualization infrastructure of a large enterprise having various building and infrastructure at various geo-locations. In such an example, information technology (IT) is located at a first location (e.g., location 510), an engineering team is located at a second location (e.g., location 520) and sales team is located at location 530.

Accordingly, appliances 510-1 through 510-4 may be grouped together at a first location 510 to support the demand for virtual machines of the IT team, appliances 510-1 and 510-2 are grouped together at location 520 to support the demand of virtual machines for the engineering team, and appliance 530-1 is located at location 530 to support the demand of virtual machines for the sales team.

As will be described in further detail below, GUI module 326 enables a GUI to facilitate the creating and managing of hosts and virtual machines. Moreover, the GUI is able to facilitate in managing the virtualization infrastructure by displaying the attributes of the appliances. For example, the GUI would display the particular health, resources used, and the like, for each of the appliances in virtualization infrastructure 500.

Example Virtual Environment

Figure 6:
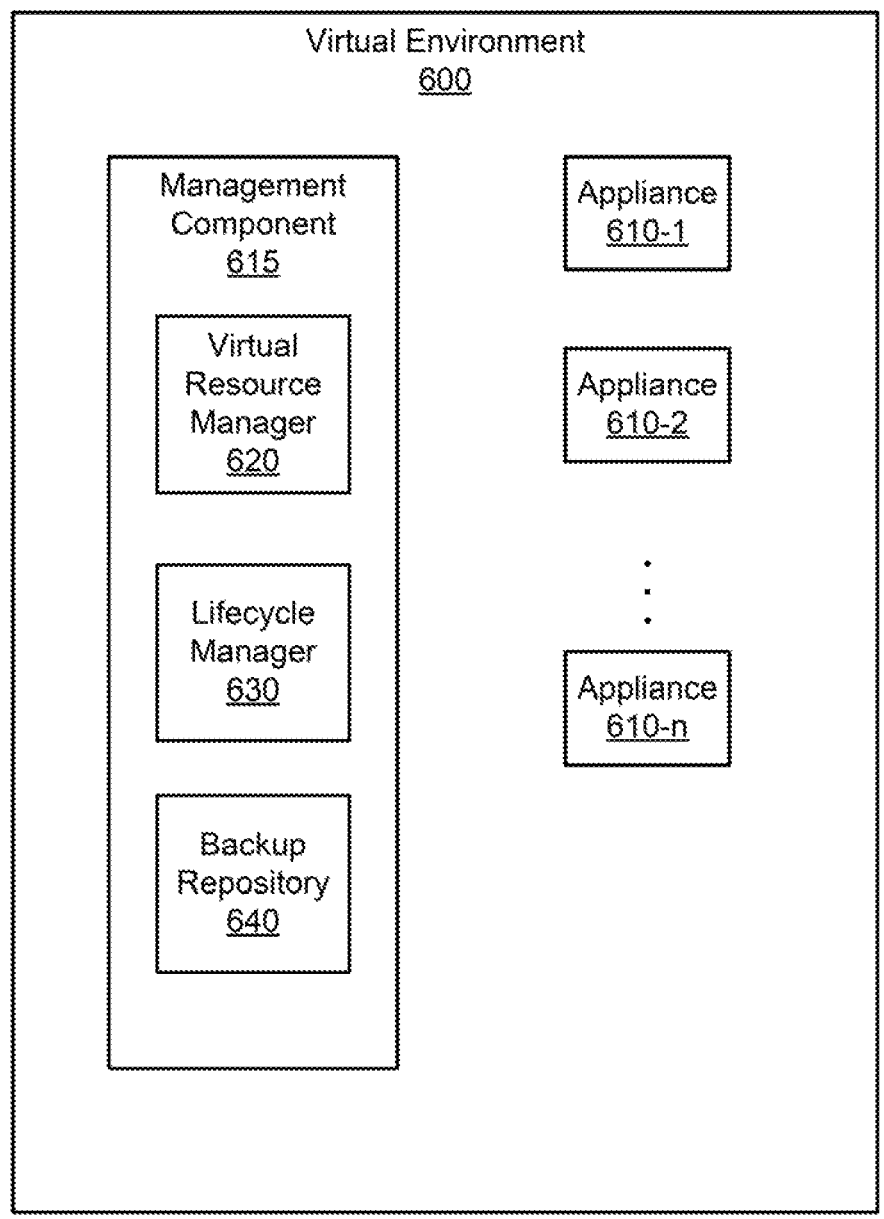
FIG. 6 illustrates an example virtual environment, in accordance with an embodiment.

FIG. 6 illustrates an example virtual environment 600 (e.g., a cloud environment) in accordance with an embodiment. Virtual environment 600 may include one or more appliances. Virtual environment 600, in one embodiment, includes appliance cluster 610 that includes appliances 610-1 through 610-n (e.g., a plurality of appliances 300 of FIG. 3). Appliances 610-1 through 610-n are communicatively coupled and act as a platform for managing the virtualization infrastructure and deploying virtual machines. VMware Cloud Foundation (VCF) is an example virtual environment 600.

Virtual environment 600 also includes management component 615 that includes virtual resource manager 620 and lifecycle manager 630. It should be appreciated that management component 615 may be implemented in a computing device, either virtual or physical, within virtual environment 600, and is communicatively coupled to appliances 610-1 through 610-n. Management component 615 may be implemented within one or more of appliances 610-1 through 610-n.

In various embodiments, virtual resource manager 620 is for managing allocation of hosts of appliances 610-1 through 610-n. For example, virtual resource manager 620 operates to make resources of appliances 610-1 through 610-n (e.g., storage hardware, computing hardware, and networking hardware) work together to achieve installation/operation and optimizing the resources for improved performance within virtual environment 600. Virtual resource manager 620 translates application requirements to physical infrastructure requirements. In accordance with various described embodiments, workload domains are mapped to a management cluster deployment (e.g., a vSphere cluster of VMware, Inc.) in a deployment (e.g., a rack deployment). Moreover, as additional appliances are added to virtual environment 600, cross-rack clusters become an option. Examples disclosed herein facilitate improved workload domain configuration and management.

As utilized herein, a workload domain is an abstraction that can be applied to a number of different types of compute workloads. This allows the administrator to deploy capacity for specific workload types using a policy-driven approach on top of physical resources. In various embodiments, a workload domain has a set of policies that are configurable by the user during the deployment process. For example, a workload domain can be configured according to capacity required (e.g., host count and storage requirements), availability required, performance required, and networks required.

In some embodiments, a workload domain is a grouping of hosts of appliances 610-1 through 610-n. It should be appreciated that a workload domain can include any number of hosts, and that hosts of a workload domain con be distributed across any number of appliances.

In various embodiments, management component 615 is a group of physical machines and/or virtual machines (VM) that host core cloud infrastructure components necessary for managing a software defined data center (SDDC) in a cloud computing environment that supports customer services. Cloud computing allows ubiquitous, convenient, on-demand network access to a shared pool of configurable computing resources. A cloud computing customer can request allocations of such resources to support services required by those customers. For example, when a customer requests to run one or more services in the cloud computing environment, one or more workload domains may be created based on resources in the shared pool of configurable computing resources. Examples disclosed herein enable customers to define different domain types, security, capacity, availability, and performance requirements for establishing workload domains in server rack deployments without requiring the users to have in-depth knowledge of server rack hardware and configurations.

Virtual resource manager 620 enables the ability for streamlined and automated data center operations and the delivery of service offerings, such as virtual infrastructure (VI) and virtual desktop infrastructure (VDI) environments, based on a SDDC or cloud-based architecture. In some embodiments, an instance of virtual resource manager 620 is deployed on each appliance 610-1 through 610-n as part of a managed cluster of services.

Virtual resource manager 620 manages the physical hardware resources (e.g., hosts) of appliances 610-1 through 610-n. For example, virtual resource manager can create a workload domain out of the underlying physical hardware resources of appliances 610-1 through 610-*n*. It should be appreciated that underlying physical hardware resources of a workload domain may span one or more physical racks (or smaller units such as a hyper-appliance or half rack) such that virtual resource manager 620 handles physical management of those resources.

Virtual resource manager 620 tracks available capacity in appliances 610-1 through 610-*n*, maintains a view of a logical pool of virtual resources, and translates logical resource provisioning to allocation of physical hardware resources. Virtual resource manager 620 interfaces with components of the virtual environment 600 to manage and present a logical view of underlying resources such as hosts and clusters. Virtual resource manager 620 also uses the logical view for orchestration and provisioning of workloads.

Lifecycle manager 630 enables automated updating of components of virtual environment 600. In some embodiments, lifecycle manager 630 is communicatively coupled to a software repository for accessing software updates. For example, lifecycle manager 630 receives notification of update availability for a component of virtual environment 600, downloads the update bundle, selects update targets, schedules the update, and applies the update to the target according to the schedule.

In some embodiments, management component 615 also includes backup repository 640 for storing baseline hypervisor versions for the hosts of appliances 610-1 through 610-*n*. In one embodiment, a boot bank folder from a host during initial provisioning of the host is copied into backup repository 640. In one embodiment, where the hypervisor is an ESXi hypervisor, the stage.tgz file from each host is also copied into backup repository 640 during initial provisioning. Initial provisioning typically occurs prior to shipping to a customer, such that restoring to the baseline hypervisor version is also referred to as a factory reset.

Example Host Allocations within a Virtual Environment

Figure 7:
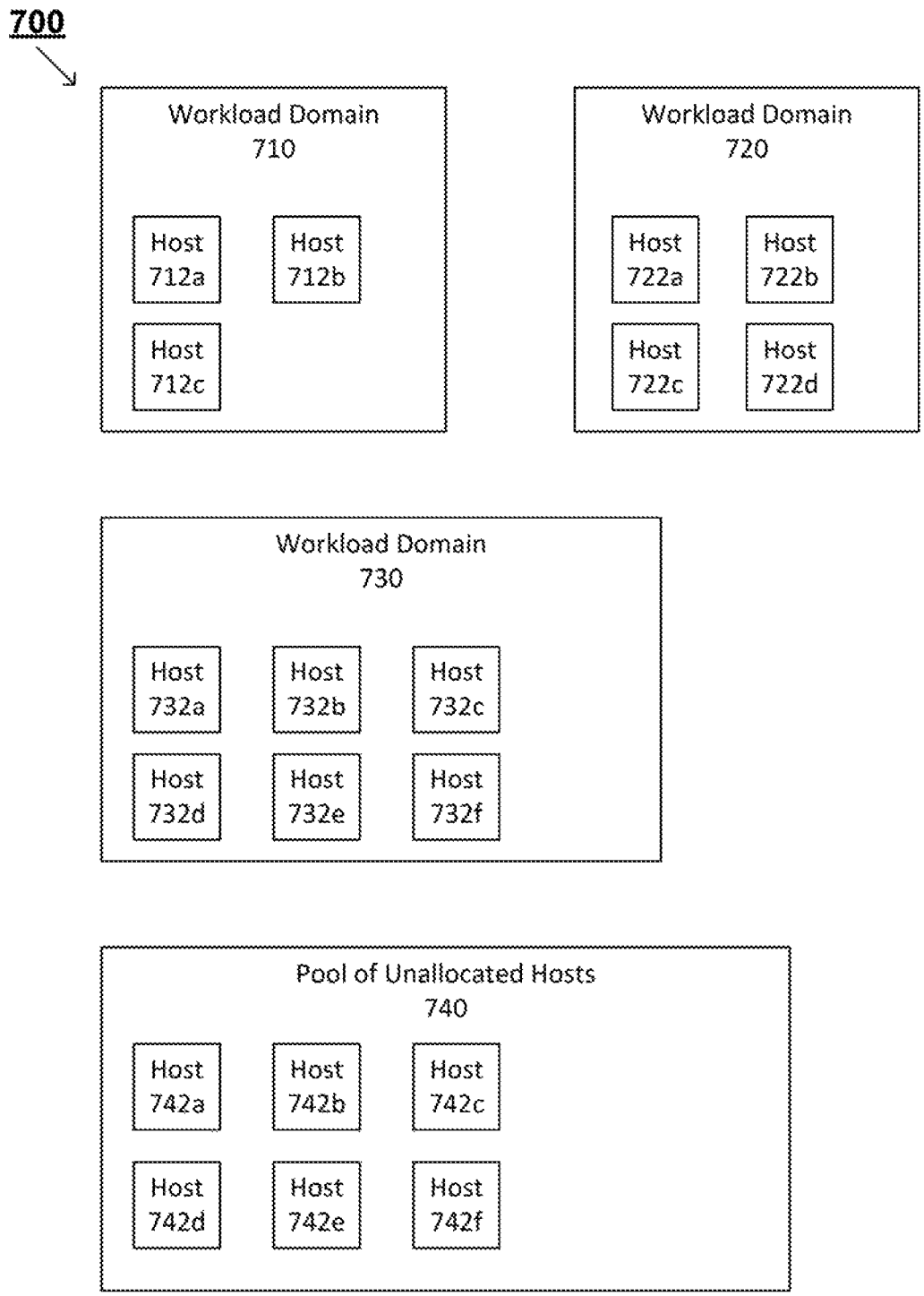
FIG. 7 illustrates an example allocation of hosts to workload domains, in accordance with an embodiment.

FIG. 7 illustrates an example allocation 700 of hosts to workload domains 710, 720, and 730, in accordance with an embodiment. Workload domains 710, 720, and 730, execute on hosts of appliances (e.g., appliances 610-1 through 610-*n* of FIG. 6). In various embodiments, hosts are allocated to workload domains 710, 720, and 730 according to demand and availability. For example, workload domains 710, 720, and 730 may be used to provision capacity based on user inputs that specify one or more of domain type, security, availability requirements, performance requirements, and capacity requirements. Based on these user inputs, management component 615 determines whether a deployment is possible. If a deployment is possible, the management component 615 determines an optimal host set that meets the user-specified requirements. It should be appreciated that allocation of the hosts of workload domains 710, 720, and 730 may be based on a policy-driven approach that can be specified and changed by a user.

Hosts can be added to or removed from workload domains 710, 720, and 730, and workload domains may be added or deleted. When hosts are released from workload domains, they get released to pool of unallocated hosts 740 so that they can be allocated to other workload domains. In one embodiment, upon being released to pool of unallocated hosts 740, the host maintains the hypervisor version it is operating, where the hypervisor version may be maintained until a future allocation of the host to a workload domain.

As illustrated in FIG. 7, workload domain 710 includes hosts 712*a* through 712*c*, workload domain 720 includes hosts 722*a* through 722*d*, and workload domain 730 includes hosts 732*a* through 732*f*. Pool of unallocated hosts 740 includes hosts 742*a* through 742*f*. It should be appreciated that an allocation can include any number of workload domains and hosts (subject to availability), of which the illustrated allocation 700 is an example.

Figure 8:
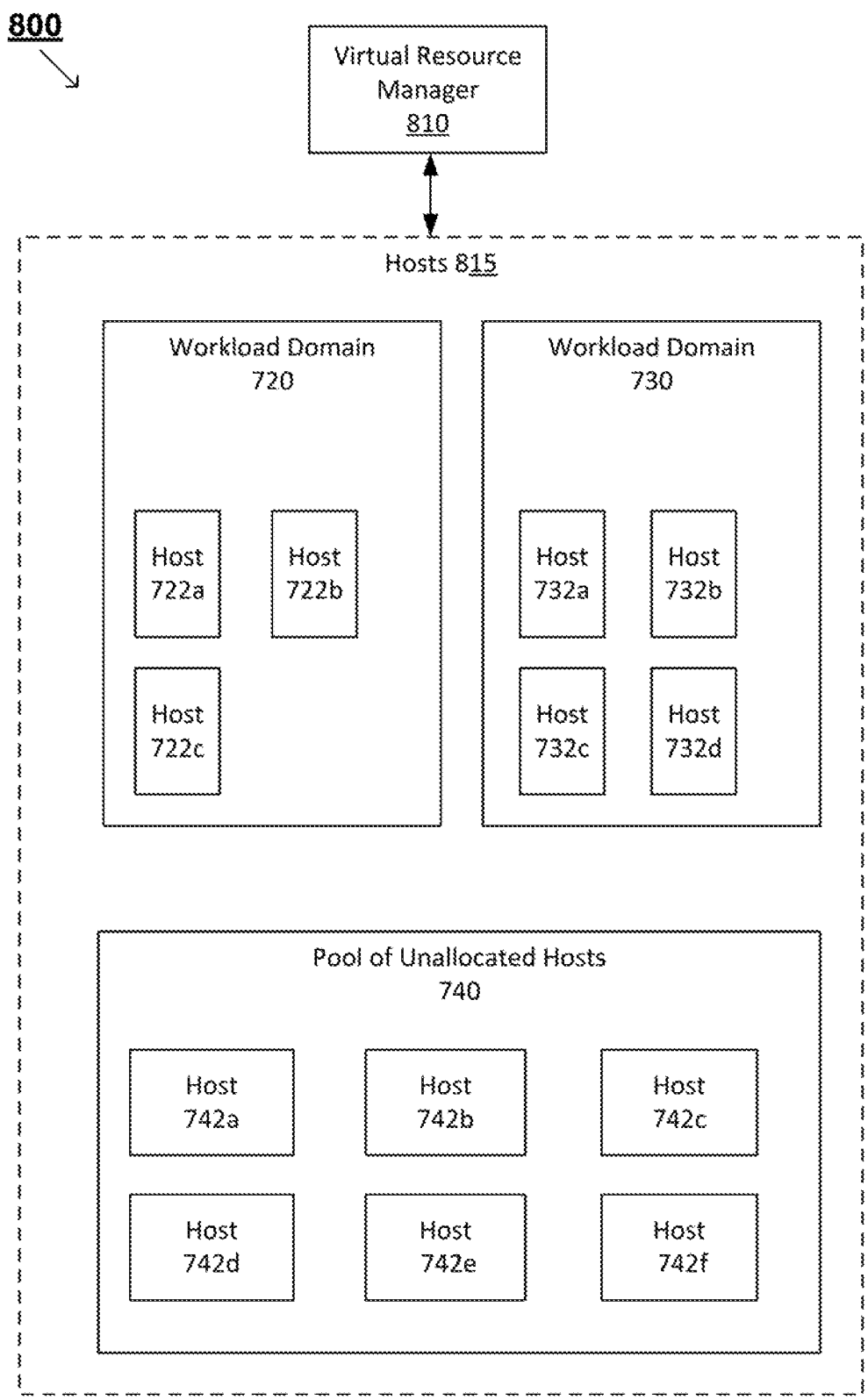
FIG. 8 illustrates an example block diagram of components of virtualization infrastructure for managing hosts of appliances, in accordance with various embodiments.

FIG. 8 illustrates an example block diagram of components of virtualization infrastructure 800 for managing hosts 815 of appliances (e.g., appliance 610-1 through 620-*n* of FIG. 6), in accordance with various embodiments. It should be appreciated that virtualization infrastructure 800 may include other components, as described above, and that FIG. 8 illustrates certain components so as to not obfuscate the described embodiments.

With reference to FIG. 8, as illustrated, virtualization infrastructure 800 includes virtual resource manager 810 and hosts 815 which are allocable to workload domains 720 and 730. As described above, it should be appreciated that hosts 815 can be included within one or more appliances, such that hosts of different appliances can be allocated to a workload domain and that hosts of the same appliance can be allocated to different workload domains.

Pool of unallocated hosts 740 includes hosts of virtualization infrastructure 800 that are not allocated to a workload domain. Virtual resource manager 810 is configured to add or remove a host to pool of unallocated host 740 to a workload domain.

Figure 9:
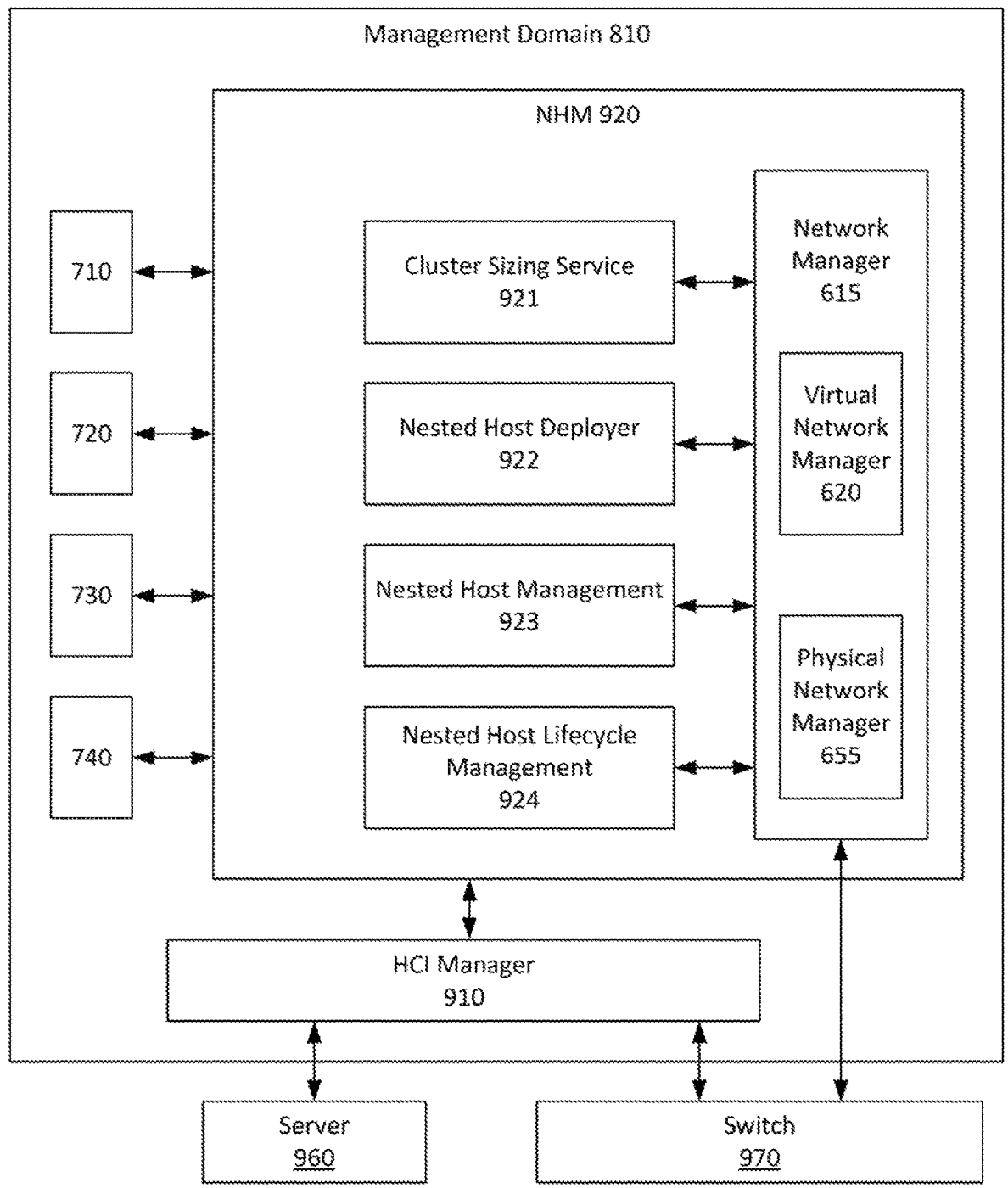
FIG. 9 illustrates an example block diagram of a nested host manager architecture, in accordance with various embodiments.

FIG. 9 illustrates an example block diagram of a nested host manager architecture 900, in accordance with various embodiments. In one embodiment, architecture 900 includes management domain 810, network manager 615, server 960, switch 970, and workload domains 710-740 which are described above in detail and not repeated herein for purposes of clarity. In one embodiment, network manager 615 includes virtual network manager 620 and a physical network manager 655.

In one embodiment, management domain also includes hyper-converged infrastructure (HCI) manager 910 and NHM 920 includes cluster sizing service 921, nested host deployer 922, nested host management 923, and nested host lifecycle management 924.

In general, HCI manager 910 controls all aspects of the hardware and software resources bundled within the HCI instance. HCI Manager 910 is responsible for creation and maintenance of workload domains including life cycle management of all the components in the software defined datacenter. The operation of architecture 900 is discussed below.

Although a number of components are shown, it should be appreciated that architecture 900 could include more or fewer components, combinations of a plurality of components into a single block, separation of a single block into a plurality of different components, and the like.

Figure 10:
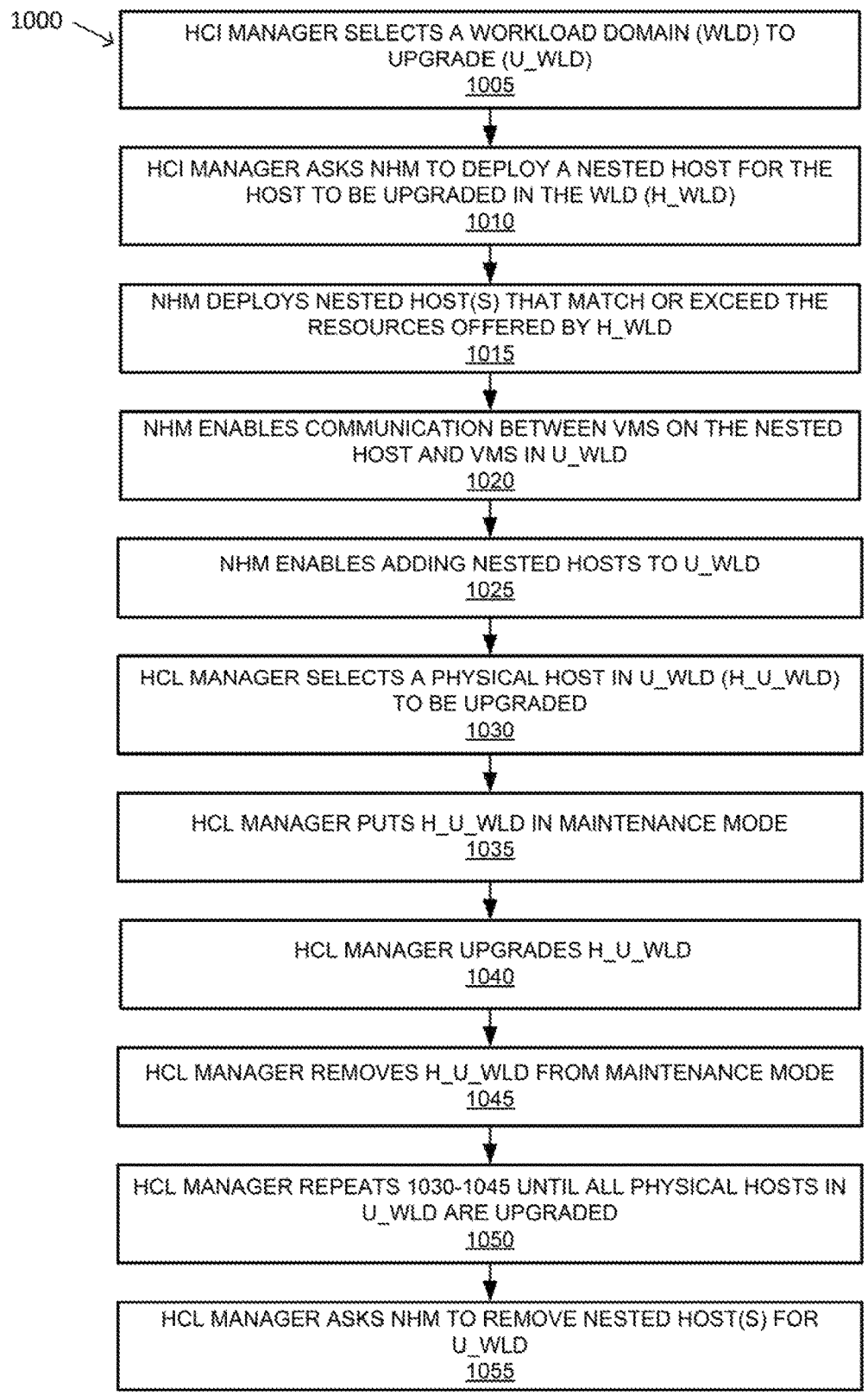
FIG. 10 depicts a flow diagram for utilizing the nested host manager, according to various embodiments.
Figure 11:
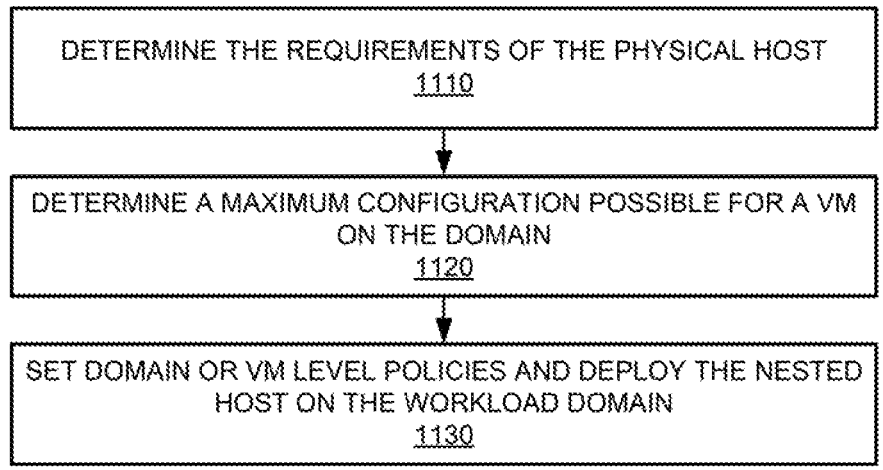
FIG. 11 depicts a flow diagram for sizing a nested host(s) by the nested host manager, according to various embodiments.
Figure 12:
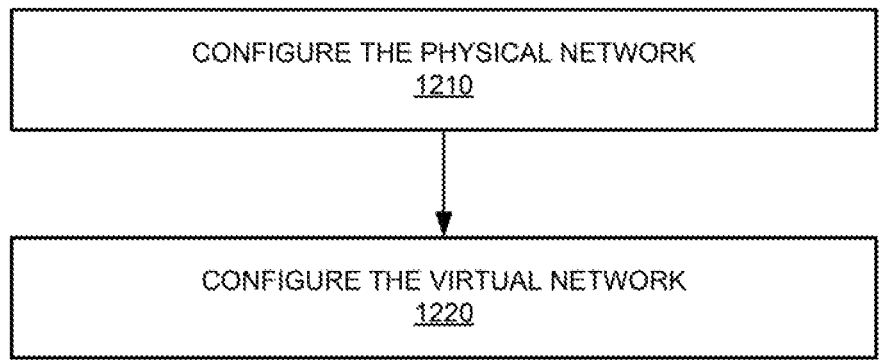
FIG. 12 depicts a flow diagram for configuring networking to enable communications between VMs on nested host(s) and VMs in the upgraded workload domains, according to various embodiments.

Example Method of Operation for Nested Host Manager in A Hyper-converged Infrastructure for Reliable High-Performance Upgrades with Zero System Impact The following discussion sets forth in detail the operation of some example methods of operation of embodiments. With reference to FIGS. 10 through 12, flow diagrams 1000, 1100, and 1200, illustrate example procedures used by various embodiments. Flow diagrams 1000, 1100, and 1200 include some procedures that, in various embodiments, are carried out by a processor under the control of computer-readable and computer-executable instructions. In this fashion, procedures described herein and in conjunction with flow diagrams 1000, 1100, and 1200 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 110 and/or virtualized environment 120). The computer-readable and computer-executable instructions, which reside on tangible computer readable storage media, are used to control or operate in conjunction with, for example, one or some combination of processors of the computer environments and/or virtualized environment.

It is appreciated that the processor(s) may be physical or virtual or some combination (it should also be appreciated that a virtual processor is implemented on physical hardware). Although specific procedures are disclosed in flow diagrams 1000, 1100, and 1200 such procedures are examples. That is, embodiments are well suited to performing various other procedures or variations of the procedures recited in flow diagrams 1000, 1100, and 1200. Likewise, in some embodiments, the procedures in flow diagrams 1000, 1100, and 1200 may be performed in an order different than presented and/or not all of the procedures described in one or more of these flow diagrams may be performed. It is further appreciated that procedures described in flow diagrams 1000, 1100, and 1200 may be implemented in hardware, or a combination of hardware with firmware and/or software provided by appliance 300.

FIG. 10 depicts a flow diagram 1000 of a method for utilizing the nested host manager (NHM) 920, according to various embodiments. In one embodiment, nested host(s) (e.g., a hypervisor in a Virtual Machine) can be deployed, configured, and added to the workload domain (e.g., 710-740) as substitute host(s) to maintain the cluster strength during an upgrade. Meaning, when the physical host is taken down for an upgrade, it will be substituted by one or more nested hosts such that the cluster strength in terms of CPU, Memory and Storage is preserved.

In one embodiment, HCI manager 910 is well positioned to control all aspects of the hardware and software resources bundled within the HCI instance. HCI manager 910 is responsible for creation and maintenance of workload domains (e.g., 710-740) including life cycle management 924 of all the components in the software defined datacenter.

With complete knowledge of the HCI instance, HCI manager 910 is able to provide information about workload domains (e.g., one or more of 710-740) that are not running at their full capacity. In one embodiment, these underutilized workload domains (e.g., one or more of 710-740) are chosen to run nested hosts to aid an upgrade of another workload domain. In a case where the use of an underutilized workload domain is not feasible (e.g., owing to organizational restrictions, or the like) a secure workload domain (e.g., 740) is configured with a set of physical hosts meant to run only nested hosts.

In one embodiment, the nested host(s) are deployed on the management domain 810 where the HCI manager 910, along with other components to manage the HCI instance, are deployed.

In one embodiment, due to the overhead to deploy, configure, and add a nested host to a workload domain to be upgraded, the number of required nested hosts is minimized. However, since a nested host is a virtual machine running on a host in the HCI, it is possible that one physical host might not be able to provide enough resources to run a nested host as large as the physical host being taken down for an upgrade. Moreover, a workload domain (e.g., 720) selected to run the nested hosts might have a plethora of restrictions on the number and size of virtual machines running at a time to enable value-add services like high availability. Multiple nested hosts might have to be deployed to satisfy compute, memory and storage provided by a physical host.

In one embodiment, NHM 920 is responsible to deploy one or more nested hosts in workload domain(s) (O_WLD) other than the one that is being upgraded. For example, as shown in FIGS. 7 and 9, if one or more of hosts 712a-712c in workload domain 710 are being upgraded, then NHM 920 will deploy or utilize one or more of the nested hosts in the other workload domains (e.g., one or more of 720-740).

In one embodiment, as described herein, NHM 920 will size the nested hosts appropriately to comply with policies defined on the O_WLD they are deployed and add them to the workload domain (U_WLD) which is being upgraded. The collection of all the nested hosts added to U_WLD will fulfill the gap left by the physical host taken down for an upgrade.

In one embodiment, a workload domain upgrade involves upgrading one host at a time. If the U_WLD has homogenous hosts, meaning all the hosts equally contribute compute, memory and storage, HCI manager 910 could ask NHM 920 to deploy nested host(s) to substitute one physical host in the workload domain before triggering an upgrade. In one embodiment, since one host is upgraded at a time, U_WLD strength never goes below the original. Once all the physical hosts have been upgraded, HCI manager 910 will ask NHM 920 to remove the nested host(s).

If one embodiment, the nested hosts can be deployed to substitute multiple physical hosts in U_WLD at the same time, thereby making it possible to trigger parallel host upgrades.

At procedure 1005 of flow diagram 1000, HCI manager 910 selects a workload domain U_WLD to upgrade (e.g., domain 710). At procedure 1010, HCI manager 910 asks NHM 920 to deploy a nested host 722b for host 710a in the U_WLD (e.g., domain 710). For example, in one embodiment, HCI manager 910 provides NHM 920 information about the physical host(s) (e.g., hosts 712a-712c) in U_WLD (e.g., domain 710) and a list of other workload domains (O_WLDs) (e.g., one or more of domains 720-740) where nested hosts can be deployed. NHM 920 will determine the free resources on one or more of the O_WLDs from the list of O_WLDs, and size the nested hosts appropriately and in accordance with policies defined on the O_WLD it is deployed on.

At procedure 1015, NHM 920 deploys nested host(s) (e.g., host 722a) that match or exceed the resources offered by host 712a. In one embodiment, NHM 920 will consider a number of aspects while sizing and deploying nested hosts. The aspects include, but are not limited to, deploying larger nested hosts on workload domain with more free resources, deploying nested hosts on physical hosts in the same rack where the upgraded host was placed to reduce inter rack communication, and/or looking for average VM sizing on U_WLD to estimate sizing for nested hosts. Additional details are provided in the following discussion of FIG. 11.

FIG. 11 depicts flow diagram 1100 for sizing a nested host(s) by the NHM 920, according to various embodiments. For example, HCI manager 910 needs to trigger hypervisor upgrades for a workload domain (U_WLD). It does so sequentially by taking one host down at a time. Considering all hosts have same configuration in terms of compute, memory and storage, HCI manager 910 asks NHM 920 to deploy nested hosts to substitute one host in U_WLD and use the management workload domain (O_WLD) to deploy the nested hosts thereon.

With reference to FIG. 11, at procedure 1110 of flow diagram 1100, NHM 920 determines the requirements of the physical host. For example, assume the physical host has CPU=16 cores at 2 GHz per core, Memory=64 GB, Storage 1 TB. NHM 920 will look at each host in the management domain and the policies configured to find a maximum memory available for a VM. In one embodiment, NHM 920 will get this information from the entity (vCenter) managing the workload domain (e.g., virtual network manager 620).

At procedure 1120 of flow diagram 1100, NHM 920 determines a maximum configuration possible for a VM on the domain, and reserves the capacity. For example, the maximum configuration possible is a VM with 32 GB memory, 500 GB of storage can be deployed. Taking the overhead for the nested host in consideration, for example, 2 GB memory and 4 GB storage, it still has to satisfy 64-(32-2)=34 GB memory and 1024-(500-4)=520 GB of storage of the physical host.

NHM 920 reserves the allowed capacity, and looks for the next largest VM that can be deployed. NHM 920 continues to look until the original requirement is met. Once the number of nested hosts is finalized, NHM 920 allocates virtual CPUs to the nested hosts appropriately (larger nested hosts deserve more). vCPU count can be matched to the number of cores in the original host plus the overhead for the nested hosts deployed.

At procedure 1130 of flow diagram 1100, NHM 920 sets domain or VM level policies and deploys the nested host on the workload domain (e.g., domain 720). In one embodiment, the policies guarantee that all the nested hosts in the cluster get the promised CPU, memory and storage resources. In one embodiment, in VMware context, a resource pool (such as pool of unallocated hosts 740 of FIG. 7) is created for all the nested hosts to reside on the management cluster. The resource pool can have reservations set, in the above example, 16*2=(32 GHz+overhead for nested ESXIs) for CPU and (64 GB+overhead for nested ESXIs) for memory.

With reference to FIG. 10, at procedure 1020, NHM 920 enables communication between VMs on nested hosts and VMs in U_WLD. That is, to enable communication between the VMs now running on the nested host in the other workload domain (O_WLD) with other VMs running in the workload domain being upgraded. In one embodiment, to develop the networking that enables the communication, NHM 920 will take the steps described in FIG. 12.

FIG. 12, depicts of a flow diagram 1200 for configuring networking to enable communications between VMs on nested host(s) and VMs in the upgraded workload domains, according to various embodiments. That is, a networking configuration on the O_WLD and U_WLD that is made to enable communication between the physical and nested hosts, after which the nested hosts are added to U_WLD.

At procedure 1210 of flow diagram 1200, NHM 920 configures the physical network using the physical network manager 655. For example, NHM 920 could configure the top of the rack switch 970 (or other physical components) with VLANs associated to the workload domain/cluster to be upgraded.

At procedure 1220, NHM 920 configures the virtual network using the virtual network manager 620. In one embodiment, NHM 920 configures the virtual network in O_WLD with VLANs associated with the workload domain/ cluster to be upgraded. For example, in VMware context, this would involve creation of port groups required by VMs in the domain to be upgraded on the distributed virtual switch in the O_WLD and appropriately tagging them with the correct VLANS.

With reference again to FIG. 10, as shown at procedure 1025, NHM 920 enables adding nested hosts to U_WLD. In one embodiment, as shown at procedure 1030, HCI manager 910 selects a physical host 712a in U_WLD which needs to be upgraded. In one embodiment, as shown at procedure 1035, HCI manager 910 puts host 712a in maintenance mode. In one embodiment, HCI manager 910 also sets the correct maintenance policy for host 712a.

At procedure 1040, HCI manager 910 upgrades host 712a. At procedure 1045 once the upgrade is complete, host 712a is removed from maintenance mode by HCI manager 910. At procedure 1050, procedures 1030 through 1045 are repeated till all physical hosts (e.g., hosts 712a-712c) in U_WLD are upgraded.

In one embodiment, as shown at procedure 1055, HCI manager 910 asks NHM 920 to remove the nested hosts for U_WLD. In one embodiment, to remove the nested hosts, NHM 920 puts the nested hosts in maintenance mode, removes the nested hosts for U_WLD, and then destroys the nested hosts from the management domain 810.

Although a number of procedure steps have been provided to illustrate one embodiment for upgrading each host in a workload domain in a one-at-a-time format, it should be appreciated that multiple hosts can be upgraded simultaneously if resources permit.

In one embodiment, if U_WLD does not have homogenous hosts, nested hosts can be deployed for the largest host in the cluster. In one embodiment, the management workload domain is selected to deploy nested hosts on, and all the hosts in U_WLD have same configurations.

It is noted that any of the procedures, stated above, regarding flow diagrams 1000, 1100, and 1200 may be implemented in hardware, or a combination of hardware with firmware and/or software. For example, any of the procedures are implemented by a processor(s) of a cloud environment and/or a computing environment.

By using the procedures, such as or similar to, those disclosed above, a number of advantages are obtained. These advantages include the capability for domain operations to continue normally without a performance impact. The ability to upgrade multiple hosts in parallel. No need for any additional physical resources. Moreover, since the number of hosts in a workload domain that is upgraded is greater than or equal to the original count, anti-affinity rules on the domain remain unchanged. In another advantage, domain operations are not impacted by upgrade failures. Further the solution maximizes the utilization of resources across the HCI instance. In so doing, the above procedure results in a reliable, seamless upgrade where the upgrade(s) neither impact domain operation nor incur the need to plan for availability of backup physical resources to handle failure scenarios.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, hypervisor, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer-implemented method for using a nested host manager in a hyper-converged infrastructure to streamline an upgrade process for one or more hosts in a workload domain of a plurality of workload domains, the method comprising:

the nested host manager determining that an update is required for a first workload domain of the plurality of workload domains, the first workload domain having two or more hosts and the two or more hosts comprising physical hosts;

in response to determining that an update is required, the nested host manager:

designating at least one host of the two or more hosts for an upgrade;

evaluating a resource allotment of the at least one host and determining resource requirements of the at least one host;

evaluating other workload domains of the plurality of workload domains to determine resource availability of each of the other workload domains;

in response to the evaluating, selecting a second workload domain from among the plurality of workload domains for deploying a nested host, the second domain having resource availability sufficient to satisfy the resource requirements of the at least one host;

sizing the nested host in accordance with the resource requirements of the at least one host, the nest host comprising a virtualized host having a nested resource allotment that is larger than the resource allotment of the at least one host;

deploying the nested host in the second workload domain;

configuring a communication network to redirect any communication normally handled by the at least one host to be handled by the nested host;

putting the at least one host in a maintenance mode;

updating the at least one host;

returning the updated at least one host from the maintenance mode to an operational mode;

responsive to the returning of the updated at least one host to the operational mode, removing the nested host from the second workload domain;

repeating the designating, evaluating, selecting, configuring, putting, updating returning, and removing for each additional host of the two or more hosts in the first workload domain.

2. The computer-implemented method of claim 1, further comprising:

performing the designating, evaluating, selecting, configuring, putting, updating and returning for every host in the first workload domain for a parallel host upgrade for every host in the first workload domain.

3. The computer-implemented method of claim 1, further comprising:

deploying the nested host on a physical host in a same rack as the at least one host.

4. The computer-implemented method of claim 1, wherein the configuring of the communication network comprises:

configuring a physical network; and configuring a virtual network.

5. The computer-implemented method of claim 1, further comprising:

creating a resource pool for a plurality of nested hosts to reside on, the resource pool created in a management cluster.

6. The computer-implemented method of claim 1, further comprising:

selecting the second workload domain based on the second workload domain being an underutilized workload domain.

7. A non-transitory computer readable storage medium, wherein the non-transitory computer readable storage medium is not a signal, having computer readable program code stored thereon for causing a computer system to perform a method for using a nested host manager in a hyper-converged infrastructure to streamline an upgrade process for one or more hosts in a workload domain of a plurality of workload domains, the method comprising:

the nested host manager determining that an update is required for a first workload domain of the plurality of workload domains, the first workload domain having two or more hosts and the two or more hosts comprising physical hosts;

in response to determining that an update is required, the nested host manager:

designating at least one host of the two or more hosts for an upgrade;

evaluating a resource allotment of the at least one host and determining resource requirements of the at least host;

evaluating other workload domains of the plurality of workload domains to determine resource availability of each of the other workload domains;

in response to the evaluating, selecting a second workload domain from among the plurality of workload domains for deploying a nested host, the second domain having resource availability sufficient to satisfy the resource requirements of the at least one host;

sizing the nested host in accordance with the resource requirements of the at least one host, the nest host comprising a virtualized host having a nested resource allotment that is larger than the resource allotment of the at least one host;

deploying the nested host in the second workload domain;

configuring a communication network to redirect any communication normally handled by the at least one host to be handled by the nested host;

putting the at least one host in a maintenance mode;

updating the at least one host;

returning the updated at least one host from the maintenance mode to an operational mode;

responsive to the returning of the updated at least one host to the operational mode, removing the nested host from the second workload domain; and repeating the designating, evaluating, selecting, configuring, putting, updating returning, and removing for each additional host of the one or more hosts in the first workload domain.

8. The non-transitory computer readable storage medium of claim 7, further comprising:

creating a pool for any unallocated nested hosts to reside on, the pool created in a management cluster.

9. The non-transitory computer readable storage medium of claim 8, wherein the pool is isolated from network connectivity.

10. The non-transitory computer readable storage medium of claim 7, wherein the configuring of the communication network comprises:

configuring a physical network; and configuring a virtual network.

11. The non-transitory computer readable storage medium of claim 7, further comprising: selecting the second workload domain based on the second workload domain being an underutilized workload domain.

12. A hyper-converged infrastructure having a nested host manager to streamline an upgrade process for one or more hosts in a workload domain of a plurality of workload domains comprising:

a plurality of hosts, wherein a host of the plurality of hosts comprises a hypervisor, and wherein the plurality of hosts is allocable one or more workload domains of the plurality of workload domains;

a processor coupled to a memory; and a non-transitory computer-readable storage medium encoded with a computer program communicably coupled to the processor, the processor configured to:

determine, by the nested host manager, that an update is required for a first workload domain of the plurality of workload domains, the first workload domain having two or more hosts and the two or more hosts comprising physical hosts;

in response to determining that an update is required, the nested host manager configured to:

designate at least one host of the two or more hosts for an upgrade;

evaluate a resource allotment of the at least one host and determine resource requirements of the at least one host;

evaluate other workload domains of the plurality of workload domains to determine resource availability of each of the other workload domains;

in response to the evaluating, select a second workload domain from among the plurality of workload domains for deploying a nested host, the second domain having resource availability sufficient to satisfy the resource requirements of the at least one of the hosts;

size the nested host in accordance with the resource requirements of the at least one of the hosts, the nest host comprising a virtualized host having a nested resource allotment that is larger than the resource allotment of the at least one host;

deploy the nested host in the second workload domain;

configure a communication network to redirect any communication normally handled by the at least one host to be handled by the nested host;

put the at least one host in a maintenance mode;

update the at least one host;

return the updated at least one host from the maintenance mode to an operational mode responsive to the returning of the updated at least one host to the operational mode, removing the nested host from the second workload domain; and repeating the designating, evaluating, selecting, configuring, putting, updating returning, and removing for each additional host of the one or more hosts in the first workload domain.

13. The hyper-converged infrastructure of claim 12, wherein the processor is further to:

deploy the nested host on a physical host in a same rack as the at least one host.

14. The hyper-converged infrastructure of claim 12, wherein the processor is further to:

select the second workload domain based on the second workload domain being an underutilized workload domain.

* * * * *